May 4, 1965  G. E. WISE  3,181,909

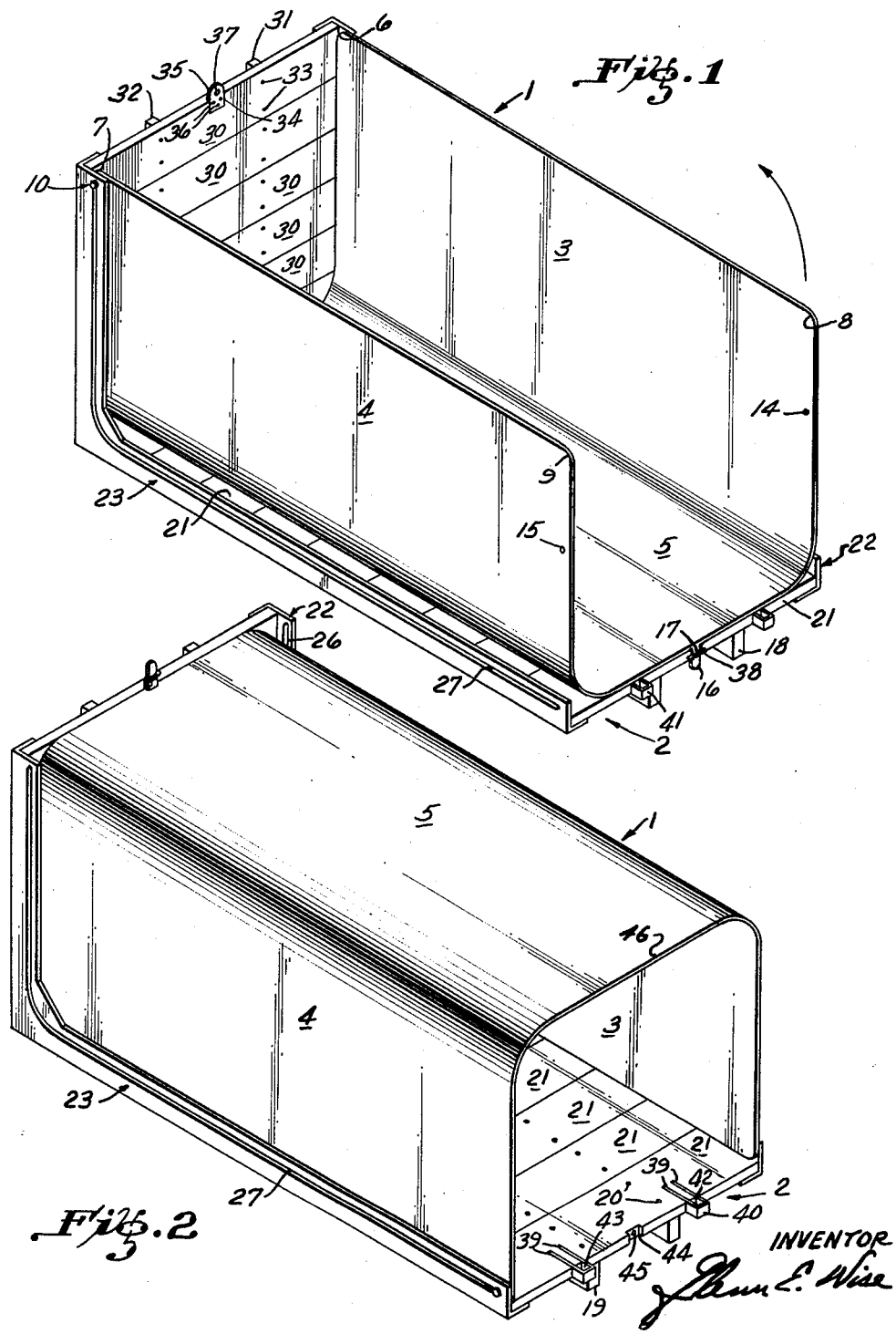

CONVERTIBLE TRUCK BOX

Original Filed Aug. 2, 1960  2 Sheets-Sheet 2

INVENTOR
Glenn E. Wise

United States Patent Office 3,181,909
Patented May 4, 1965

3,181,909
CONVERTIBLE TRUCK BOX
Glenn E. Wise, 2415 39th Place NW., Washington, D.C.
Continuation of abandoned application Ser. No. 47,075, Aug. 2, 1960. This application Mar. 23, 1964, Ser. No. 354,509
2 Claims. (Cl. 296—10)

This invention relates to a convertible cargo-carrying box for a truck, and, more particularly, to a carrying box which may be inverted to form a canopy over a truck's hauling bed when desired, and is a continuation of my abandoned application Serial No. 47,075.

One object of the invention is to increase a truck's usefulness by providing a novel, lightweight box which is adapted to serve two alternate functions. In one orientation, the box serves as a container for cargo, but in another orientation, the box becomes a canopy for protecting cargo beneath it.

Another object of the invention is to provide simple means for guiding the conversion of a truck box from a load-containing position to a load-protecting position.

Other objects will be apparent from the remainder of the specifications and from the drawings.

In the drawings which form a part of this application:

FIGURE 1 is a three dimensional view showing my convertible truck box supported on a truck bed in its load-carrying position;

FIGURE 2 is a three dimensional view showing the truck box supported on a truck bed in its load-protecting or canopy position;

Figure 3:
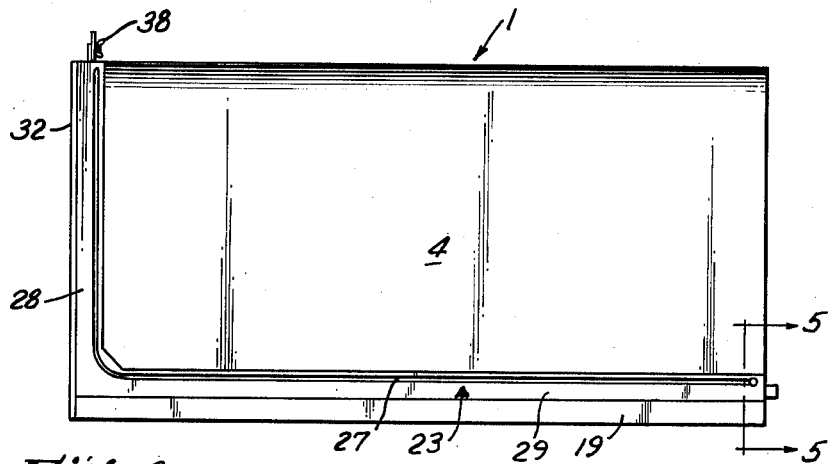
FIGURE 3 is a side elevation of the structure of FIGURE 2.

Referring now to the drawings by reference numerals, my convertible truck box, designated generally by 1, is shown mounted on a conventional truck bed, designated generally by 2. The box 1, seen in its load-carrying orientation in FIGURE 1, and in its load-protecting orientation in FIGURE 2, consists essentially of an elongated U-shaped element composed of some lightweight but strong material such as fiberglass, or the like. More particularly, box 1 includes a first side portion 3, a second side portion 4, and a connecting portion 5. The two corners of each side portion are rounded as at 6, 7, 8, and 9 for a reason to be described. Embedded in and extending laterally outwardly from each side portion one near corner 6, and one near corner 7 are portions of two identical guide pins designated generally as 10.

Figure 5:
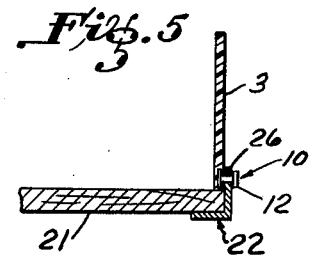
FIGURE 5 is a partial sectional view taken on the line 5—5 of FIGURE 3.
Figure 7:
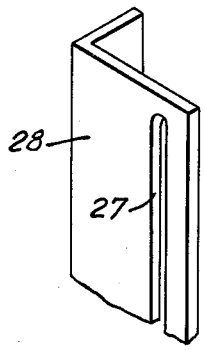
Figure 6:
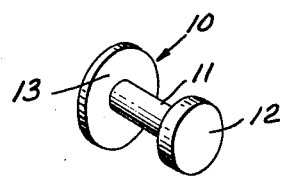
FIGURE 6 is an enlarged three dimensional showing of a guide pin employed in the invention; and, FIGURE 7 is an enlarged three dimensional showing of a portion of a guide track employed in the invention.

Each pin 10, as best seen in FIGURES 5 and 6, includes a cylindrical shank portion 11, a circular stop head 12 and a circular anchoring head 13. The heads 13 of the pins 10 are embedded in the opposite side portions 3 and 4. FIGURE 5 shows one pin 10 affixed to side 3, as described.

Near the edges of side portions 3 and 4 below corners 8 and 9 in FIGURE 1, are formed aligned apertures 14 and 15. Through these apertures may be placed the opposite ends of a tie rod if it is necessary to keep side portions 3 and 4 from spreading under load conditions. These apertures may also serve as attachment holes for the upper end of an end gate in the event an end gate is used on the truck bed.

Extending downward from the rear center of portion 5 of box 1, as seen in FIGURE 1, is an integral holddown tab 16, having formed therein a central horizontally oriented aperture 17, for a purpose to be described.

The description of the elements comprising box 1 is now completed.

The truck bed 2, much of which is conventional, is composed of two spaced longitudinal stringer elements 18 and 19, to the top edges of which are fastened as by bolts 20, or other equivalent means, a plurality of pieces of adjoining planks 21. Planks 21 form the load-supporting surface or deck of the truck bed.

Attached to the opposite side edges of the load-supporting surface, by means of bolts or the like, not shown, are two opposite, but otherwise identical guide and reinforcing rails, designated generally as 22 and 23. Since rails 22 and 23 are opposites, a description of rail 22 will also serve to describe rail 23.

Figure 4:
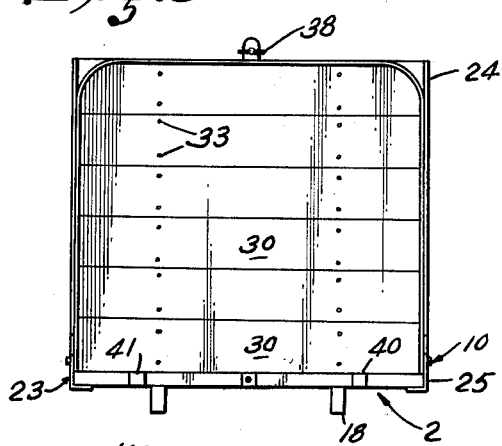
FIGURE 4 is a rear elevation of the structure of FIGURE 2.

Rail 22 is a substantially L-shaped element composed of heavy angle iron or the like. The short leg 24 of rail 22 extends vertically adjacent the front right corner of the truck deck, as seen in FIGS. 1, 2 and 4 with one of its flanges disposed parallel to the front of the truck deck and with the other of its flanges disposed parallel to the side of the truck deck. The longer leg 25 of rail 22 is integral with leg 24 and extends horizontally along and is fastened by means of bolts or the like, not shown, to the right edge of the truck bed with one of its flanges disposed horizontally and engaging the bottom of the right side of the truck deck, and with the other of its flanges disposed vertically and engaging the right-hand edge of the deck. Through the outboard flanges of legs 24 and 25 of rail 22 is formed a continuous L-shaped guide slot 26, and the shank 11 of one of the pins 10 extends through and guides along this slot during conversion of my device. A like slot in rail 23 is denoted 27, and the shank of the other pin 10 extends through and guides along slot 27. The short leg of rail 23 is numbered 28, and the longer leg is numbered 29.

Extending between, and fastened to the rear sides of the inboard flanges of the short legs 24 and 28 of rails 22 and 23, by bolts or the like, not shown, are a series of adjoining horizontally disposed planks 30 which serve to form a front board for the truck bed. Vertical riser members 31 and 32 are fastened to the front sides of the planks 30 by bolts 33, and these risers reinforce the front board. The lower ends of risers 31 and 32 may also be attached to the front ends of the stringers 18 and 19, respectively, if desired.

Fixed in a notch 34 cut into the top rear center of the upper plank 30 is a holddown plate 35. Screws 36 attach plate 35 to upper plank 30. Plate 35 has formed therein a horizontal aperture 37 which carries internal threads, not shown. When box 1 is in the position shown in FIGURE 2 the front face of the holddown tab 16 abuts the rear face of holddown plate 35 and the aperture 17 in tab 16 is aligned with the threaded aperture 37 in plate 35, as best seen in FIGURES 2 and 3. Under these circumstances a short wing-headed bolt 38 can be inserted rearwardly through aperture 17 and screwed into aperture 37 thus fixing box 1 relative to the truck bed 2 so that air currents cannot raise and damage box 2.

Fastened in notches 39 cut forwardly into the rear edge of the rear deck plank 21, by means of bolts or the like, not shown, are two U-shaped brackets 40 and 41. These brackets, in conjunction with the rear edge of rear plank 21 form sockets 42 and 43 which are adapted to receive the usual spaced stakes on a conventional stake-type end gate, not shown. If desired, in a specific application, it is obvious that the stake-type end gate mentioned above can be replaced by a conventional end gate of the type which is hinged to the rear of the truck deck.

Another notch 44 is cut into the rear edge of rear deck plank 21 to receive holddown tab 16 when the box 1 is in the position seen in FIGURE 1. Through the front face of notch 44 and thence into rear deck plank 21 is formed an aperture 45 which carries internal threads, not shown. Thus when box 1 is in the position shown in FIGURE 1 the apertures 17 and 45 in holddown tab 16 and rear deck plank 21, respectively, will be aligned and the bolt 38, previously mentioned may be inserted forwardly through aperture 17 and screwed into aperture 45 to again fix the box 1 relative to truck bed 2.

Although the operation of my device should be evident from the previous description and the drawings, I will briefly summarize how the invention operates.

First, assume that box 1 is fixed relative to the truck bed 2 in the orientation seen in FIGURE 1 by the fact that the headed pins 10 are arranged in slots 26 and 27 of rails 22 and 23, and because bolt 38 passing through aperture 17 into aperture 45 is fastening the rear of box 1 to the truck bed 2. In order to convert box 1 from a load-receiving orientation to the load-covering orientation seen in FIGURE 2, it is first necessary to remove bolt 38. After this step has been performed the rear end of box 1 can be rotated upwardly forwardly in the direction of the arrow in FIGURE 1. During such rotation the pins 10 must move downwardly in slots 26 and 27. Continued rotation and manipulation of box 1 will cause pins 10 to follow slots 26 and 27 until they are in their positions seen in FIGURE 2 at which time the box 1 will have been completely inverted from its orientation of FIGURE 1. At this time bolt 38 may now be inserted through aperture 17 and screwed into aperture 37 to lock the box 1 relative to bed 2 as previously described.

To reorient the box 1 from its FIGURE 2 position to its FIGURE 1 position, the steps just described would be accomplished in reverse. It should be noted that when box 1 is in the orientation seen in FIGURE 1 the then bottom of portion 5 rests flat on the tops of the planks 21 and thus box 1 has an ample supporting base. Also, when box 1 is oriented as seen in FIGURE 2, the pins 10 are affixed to box 1 in such manner that the lower edges of side portions 3 and 4 will rest flat on the tops of planks 21, and will thus lend element 1 ample support in its canopy orientation.

The reason for rounding the corners 6, 7, 8 and 9 of box 1 is to insure that box 1 will not wedge against adjacent structure during its conversion from one orientation to the other.

If desired a small roller may be mounted centrally of and a parallel to the edge of portion 5 denoted 46 in FIGURE 2 to minimize the friction between the box 1 and planks 21 when the box is inverted, but such a roller is optional.

It is obvious that many modifications might be made in the illustrated embodiment of this invention without departing from the spirit thereof. For example, truck bed 2 would be formed in other ways using other materials. Also it is obvious that my conversion means might be applied to existing stake body, pick-up- or other type truck beds and bodies as an attachment thereto.

If desired heads 12 of bolts 10 may be made removable from shanks 11 so that box 1 can be separated from the truck when desired by forcing side portions 3 and 4 toward each other until shanks 11 are pulled out of slots 26 and 27. Also, if desired, handholes and lightening holes may be formed in box 1 to render conversion of the box 1 less strenuous to the user.

Having now described my invention, what I claim as novel and desire to secure by Letters Patent is:

1. In a load-carrying vehicle, in combination: a bed including an upper surface; a box; said box including a pair of spaced vertically extending opposite side portions of substantially equal lengths and height having upper and lower ends, and a connecting portion extending between and joined to the lower ends of said side portions, said connecting portion being substantially coextensive in length with said side portions and having a bottom surface; and means for guiding said box to and fro between a first upright load-carrying orientation wherein the bottom surface of said box engages said upper surface of said bed and supports said box atop said bed and a second inverted load-protecting orientation wherein said upper ends of said side portions engage said upper surface of said bed and supports said box atop said bed, said means including track-forming means attached to said bed and track-following means attached to said box, said track-forming means comprising a pair of spaced mirror-image tracks each of which includes a horizontal run continuing at one end in a vertical run, one of said tracks being located outboard of and parallel to each of said side portions, said track-following means comprising a single track follower extending outwardly from the outboard side of each side portion, one of said track followers being continuously engaged with one of said tracks and the other of said track followers being continuously engaged with the other of said tracks during movement of said box from said first orientation to said second orientation.

2. The combination of claim 1, said tracks each comprising a rail having a horizontal slot in one portion thereof communicating with a vertical slot in the other portion thereof and said track followers each including a pin having one end attached to a side portion and another end located in one of said track slots.

References Cited by the Examiner

UNITED STATES PATENTS 2,552,898  5/51  Lenci _____ 296—37
3,093,403  6/63  Sumrall _____ 296—10

A HARRY LEVY, *Primary Examiner.*